(12) United States Patent
Cheng

(10) Patent No.: US 7,898,205 B2
(45) Date of Patent: Mar. 1, 2011

(54) FEEDBACK POSITIONING MODULE

(75) Inventor: Don-Hua Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 456 days.

(21) Appl. No.: 12/163,987

(22) Filed: Jun. 27, 2008

(65) Prior Publication Data
US 2009/0322317 A1    Dec. 31, 2009

(51) Int. Cl.
*G01B 7/00*    (2006.01)
*F16H 55/02*    (2006.01)

(52) U.S. Cl. .......................... 318/649; 318/626; 318/653

(58) Field of Classification Search .............. 318/9, 15, 318/16, 135, 560, 565, 626, 627, 638, 647–649, 318/652, 653, 685, 687
See application file for complete search history.

(56) References Cited

U.S. PATENT DOCUMENTS

| | | | | |
|---|---|---|---|---|
| 4,137,784 A * | 2/1979 | Griffin | | 74/89.37 |
| 4,809,106 A * | 2/1989 | Inoue | | 360/267.8 |
| 5,434,602 A * | 7/1995 | Kaburagi et al. | | 346/139 R |
| 5,602,681 A * | 2/1997 | Nakayama et al. | | 359/698 |
| 5,704,250 A * | 1/1998 | Black | | 74/89.3 |
| 2001/0015870 A1* | 8/2001 | Saliba | | 360/122 |

* cited by examiner

*Primary Examiner* — Bentsu Ro
(74) *Attorney, Agent, or Firm* — Banger Shia

(57) ABSTRACT

A linear feedback positioning module is provided with a coupling and a drive at one side of a platform having a lead screw, a movable assembly combined on the lead screw and a feedback assembly. The feedback assembly includes a magnetic scale cooperating with a read head. The magnetic scale is combined on the platform and located along the lead screw to cooperate with the lead screw. The linear feedback positioning module is further used with a backend control assembly. By such arrangements, the feedback assembly can correct error at any moment to improve the process and product accuracy and increase the production efficiency and product competitiveness.

7 Claims, 4 Drawing Sheets

FEEDBACK POSITIONING MODULE

BACKGROUND OF THE INVENTION

1. Field of the Invention

The present invention relates to a linear transmission positioning structure, and more particularly to a linear feedback positioning module for correction of error caused by linear movement.

2. Description of the Prior Art

Linear positioning modules are widely used in laser drilling machines, small milling machines, image inspection equipments, etc. Referring to FIGS. 4-5, a conventional linear positioning module comprises a loading assembly 10, a drive assembly 20 and a movable assembly 30. The loading assembly 10 is a platform 10 with a leading screw 12. The drive assembly 20 is a coupling 21 connected with a motor 22. The drive assembly 20 is fixed at one side of the loading assembly 10, and the motor 22 is connected to the lead screw 12 through the coupling 21. The movable assembly 30 is fitted on the loading assembly 10 and moves along the lead screw 12.

When in use, the motor 22 is driven by a controller, and the controller determines the amount of feed required for the rotation of the motor. When the motor 22 rotates, the coupling 21 is driven, so that the coupling 21 can control the required amount of displacement of the movable assembly 30 along the lead screw 12.

However, the manner in which the motor 22 utilizes the rotation of the coupling 21 to drive the lead screw 12 to rotate axially will cause angle difference to most of gear mates, which will cause an unacceptable tolerance after a long time of use. In addition, if the respective gears are used with the lead screw 12 for long time, back clearance is likely to occur between the gears due to attrition. The occurrence of the back clearance can also cause the accumulated error. Additionally, the lead screw is too long, so the distortion and eccentricity of the lead screw are usually invisible, after a long time of accumulation, they can also cause a very large error. Therefore, such a linear positioning module must be regularly checked by a laser measure, and the checking data will be provided for correcting the linear positioning module, thus wasting time and labor. In addition, when the checking operation is performed, the machine must be shutdown, so the production efficiency is greatly reduced. Moreover, since the product accuracy cannot be ensured due to the error caused by the linear positioning module, the product competitiveness is relatively low.

The present invention has arisen to mitigate and/or obviate the afore-described disadvantages.

SUMMARY OF THE INVENTION

The primary objective of the present invention is to provide a linear feedback positioning module, which can correct error at any moment to improve the process and product accuracy and increase the production efficiency and product competitiveness.

In order to achieve the above objectives, the linear feedback positioning module in accordance with the present invention comprises a loading assembly, a drive assembly, a movable assembly, a feedback assembly and a backend control assembly. The loading assembly includes a platform provided with a lead screw. The drive assembly is a drive connected with a coupling, and the drive is connected to the lead screw through the coupling, so as to drive the lead screw to rotate. The movable assembly is combined on the lead screw. The feedback assembly includes a magnetic scale cooperating with a read head, and the magnetic scale is combined on the platform of the leading assembly and located along the lead screw. The read head is combined on the movable assembly for cooperating with the magnetic scale. The backend control assembly includes a signal processor and a controller.

When the movable assembly of the present invention moves, the read head combined on the movable assembly can touch the elongated magnetic scale at any movement, so that the magnetic scale can receive the accurate position signal of the read head and the movable assembly at any movement. After being calculated and corrected, the accurate position signal will be fed back to the drive, so that the drive can synchronously compensate and correct the rotation angle. Therefore, the present invention can improve the positioning accuracy and the accuracy of the produced products. Moreover, the error correction is performed at any moment without machine shutdown, thus effectively increasing the production efficiency and product competitiveness.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
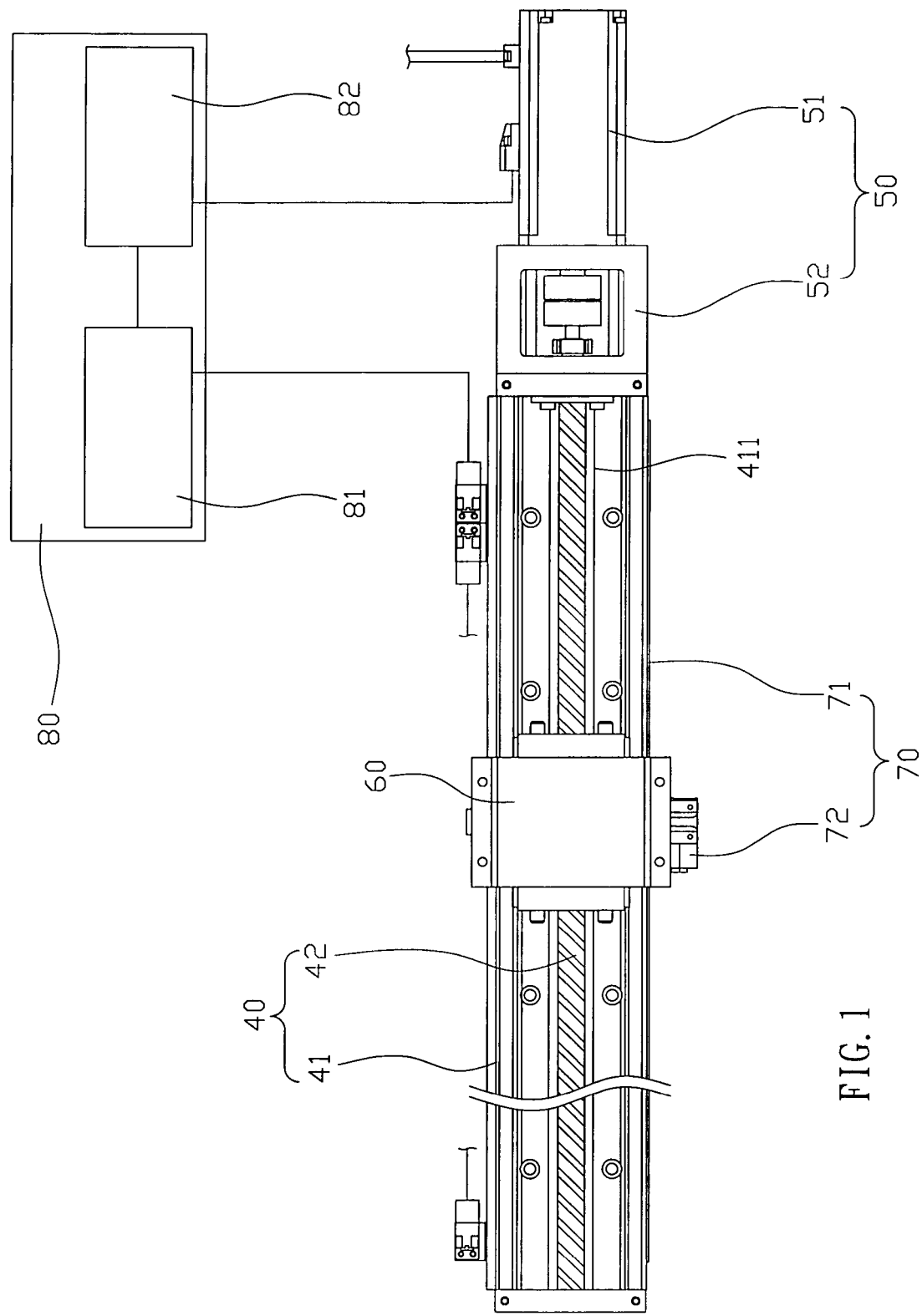
FIG. 1 is a plane top view of a linear feedback positioning module in accordance with the present invention.
Figure 2:
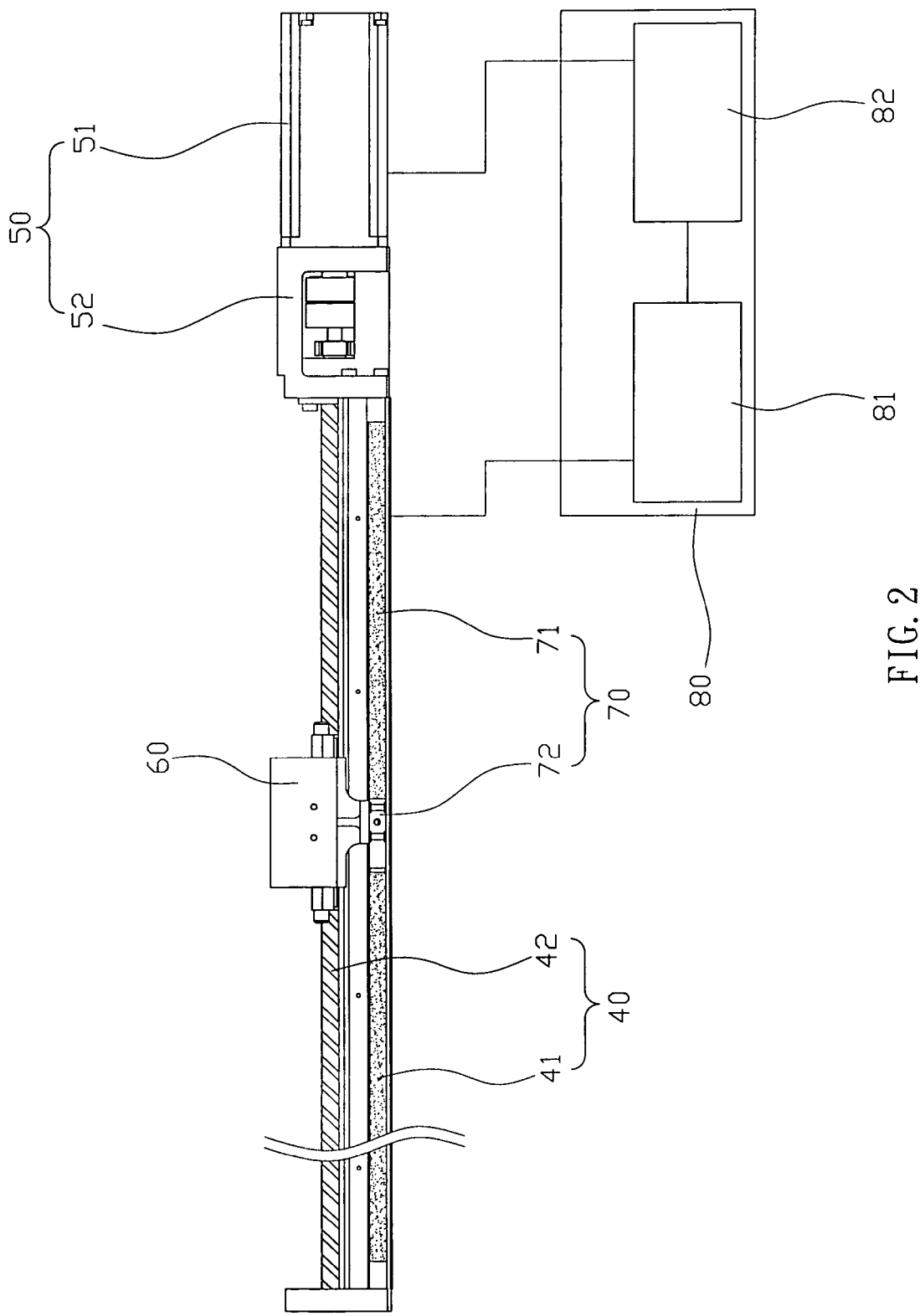
FIG. 2 is a plane side view of linear feedback positioning module in accordance with the present invention.

Referring to FIG. 1-2 first, a linear feedback positioning module in accordance with a preferred embodiment of the present invention comprises a loading assembly 40, a drive assembly 50, a movable assembly 60, a feedback assembly 70 and a backend control assembly 80.

The loading assembly 40 includes a platform 41 provided with a lead screw 42. The platform is proved with a rail 411 along the lead screw 42.

The drive assembly 50 is a drive 51 connected with a coupling 52. The drive 51 may be a servo motor or a step motor. The drive 51 is fixed at one side of the loading assembly 40 and connected to the lead screw 42 through the coupling 52.

The movable assembly 60 is fitted on the loading assembly 40 and combined with the lead crew 42. The movable assembly 60 is also provided on the rail 411 and driven by the lead screw 42 to move along the rail 411.

The feedback assembly 70 includes a magnetic scale 71 and a read head 72. The magnetic scale 71 is combined to the platform 41 of the loading assembly 40 and axially arranged along the lead screw 42. The magnetic scale 71 is at least longer than the lead screw 42 for fully measuring the moving distance of the movable assembly 60. The read head 72 is combined on the movable assembly 60 and disposed according to the magnetic scale 71 in such a manner that when the movable assembly 60 moves along the lead screw 42, the read head 72 can keep cooperating with the magnetic scale 71.

The backend control assembly 80 includes a signal processor 81 cooperating with a controller 82. The backend control assembly is connected to the feedback assembly. The signal processor 81 receives and converts the data generated from the magnetic scale 71 and the read head 72 for the controller, which controls the rotation and correction of the drive 51.

Figure 3:
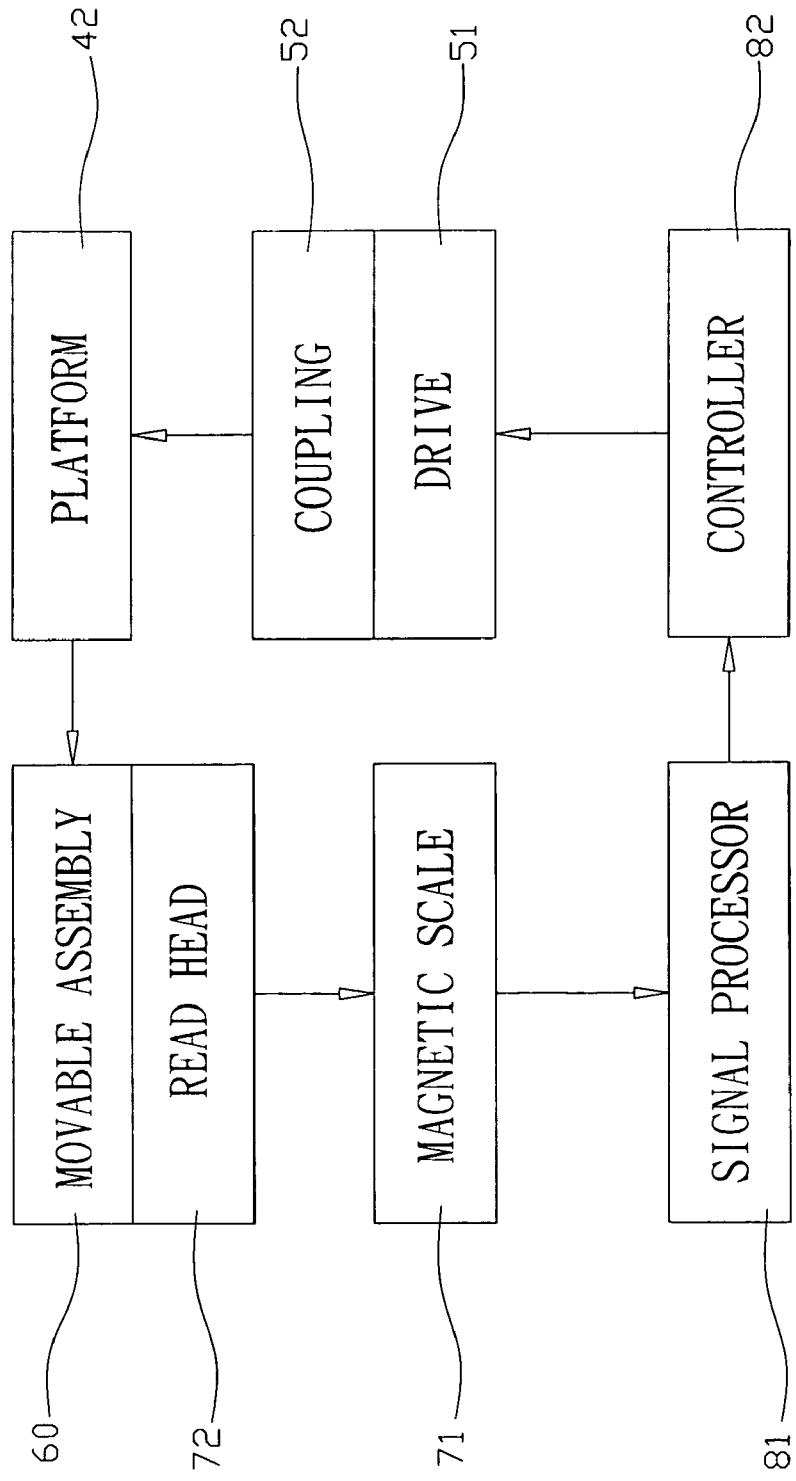
FIG. 3 is a block diagram showing the feedback process of linear feedback positioning module in accordance with the present invention.
Figure 4:
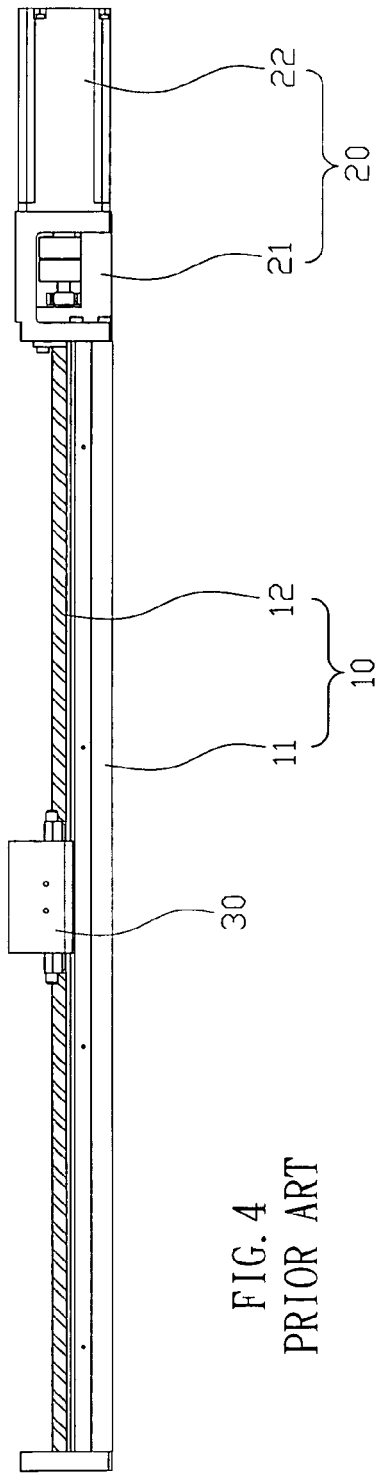
FIG. 4 is a plane side view of a conventional linear positioning module.
Figure 5:
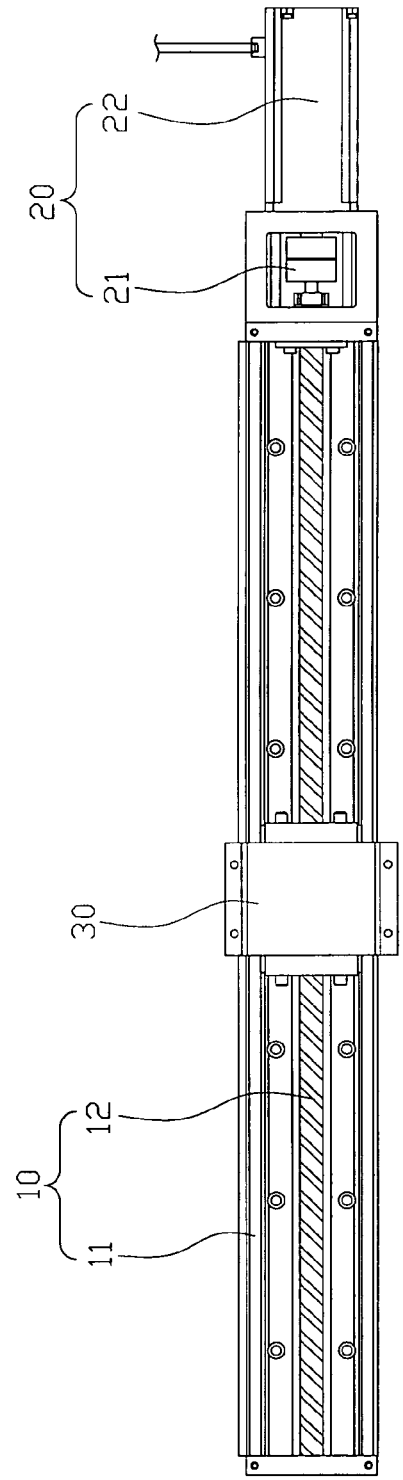
FIG. 5 is a plane top view of the conventional linear positioning module.

Referring to FIG. 3, when the drive 51 of the drive assembly 50 is actuated by the controller 82, the drive 51 will drive the coupling 52 to operate synchronously. The coupling 52 will then drive the lead screw 42 to rotate, so as to drive the movable assembly 60 to move axially with the rotation of the lead screw. Since the read head 72 is combined on the movable assembly 60, the read head 72 can move along with the movable assembly 60. At the same time, the read head 72 touches the magnetic scale 71 at any moment and sends out the position signal indicating where it is located. While receiving the position signal of the read head 72, the magnetic scale 71 synchronously transmits the position signal to the signal processor 81 of the backend control assembly 80. The signal processor 81 of the backend control assembly 80 converts the position signal of the read head 72 into digital signal, and then the digital signal will be sent to the drive 51 after being calculated and corrected by the controller 82, so as to make the drive 51 to rotate a proper angle to enable the movable assembly 60 to move as required, thus keeping the movable assembly 60 locating at a proper location and having a proper amount of feed at any moment.

As known from the above embodiment of the present invention, the present invention can achieve the following effect: when the drive 51 of the drive assembly 50 is actuated by the controller 82, the drive 51 will drive the coupling 52 and the lead screw 42 to rotate, so that the movable assembly 60 cooperates with the lead screw 42 to produce a linear axial movement. The read head 72 is combined on the movable assembly 60 and touches the elongated magnetic scale 71 at any moment in such a manner that the magnetic scale 71 can receive the proper position signal of the read head 72 and the movable assembly 60 and synchronously transmit the signal to the backend control assembly 80 where the position signal is calculated and corrected. After that, the signal will be fed back to the drive 51 to make the drive 51 to compensate and correct the rotation angle, thus improving the positioning accuracy of the linear feedback positioning module of the present invention and synchronously improving the product accuracy. In addition, the error correction is performed at any moment without machine shutdown, thus greatly improving the production efficiency and product competitiveness.

While we have shown and described various embodiments in accordance with the present invention, it is clear to those skilled in the art that further embodiments may be made without departing from the scope of the present invention.

What is claimed is:

1. A linear feedback positioning module comprising:
    a loading assembly including a platform provided with a lead screw;
    a drive assembly being connected to and driving the lead screw;
    a movable assembly being fitted on the loading assembly and combined with the lead screw, the movable assembly being driven by the lead screw;
    a feedback assembly including a magnetic scale and a read head, the magnetic scale being combined to the platform of the loading assembly and axially arranged along the lead screw, the read head being combined on the movable assembly and disposed according to the magnetic scale in such a manner that while the movable assembly moves along the lead screw, the read head keeps cooperating with the magnetic scale; and
    a backend control assembly receiving and processing a signal from the feedback assembly and controlling the drive assembly.

2. The linear feedback positioning module as claimed in claim 1, wherein the platform is provided with a rail along the lead screw, the movable assembly is provided on the rail to move along the rail.

3. The linear feedback positioning module as claimed in claim 1, wherein the drive assembly is a drive connected with a coupling, the drive is fixed at one side of the loading assembly and connected to the lead screw through the coupling.

4. The linear feedback positioning module as claimed in claim 3, wherein the drive is a servo motor or a step motor.

5. The linear feedback positioning module as claimed in claim 1, wherein the magnetic scale is longer than the lead screw for fully measuring a moving distance of the movable assembly.

6. The linear feedback positioning module as claimed in claim 1, wherein the backend control assembly includes a signal processor and a controller, the backend control assembly is connected to the feedback assembly, and the signal processor receives and processes data generated from the magnetic scale and the read head and transmits the data to the controller, which controls rotation and correction of the drive.

7. The linear feedback positioning module as claimed in claim 1, wherein the movable assembly moves axially with rotation of the lead screw, and the read head moves along with the moveable assembly since it is combined on the movable assembly, at the same time, the read head touches the magnetic scale and transmits a position signal indicating where the read head is located, to the backend control assembly, the backend control assembly will then convert, calculate and correct the signal for the drive assembly, which determines a position and a feed amount of the movable assembly.

* * * * *